US008662676B1

(12) United States Patent
Chang et al.

(10) Patent No.: US 8,662,676 B1
(45) Date of Patent: Mar. 4, 2014

(54) AUTOMATIC PROJECTOR CALIBRATION

(71) Applicant: Rawles LLC, Wilmington, DE (US)

(72) Inventors: Samuel Henry Chang, San Jose, CA (US); Edward Dietz Crump, Santa Cruz, CA (US); Manika Puri, Santa Clara, CA (US); Steve G. Gonzalez, Davenport, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 13/628,450

(22) Filed: Sep. 27, 2012

Related U.S. Application Data (63) Continuation of application No. 13/419,799, filed on Mar. 14, 2012, now abandoned.

(51) Int. Cl.
*G03B 21/14* (2006.01)
*G02F 1/00* (2006.01)
*H04N 3/227* (2006.01)
*G06K 9/46* (2006.01)
*G06K 9/18* (2006.01)

(52) U.S. Cl.
USPC .............. 353/69; 353/76; 345/158; 345/178; 348/771; 348/175; 348/177; 348/747; 382/170; 382/181; 382/193; 382/194

(58) Field of Classification Search
USPC .............. 353/69, 76; 345/158, 178; 348/771, 348/175, 177, 746, 747; 382/170, 181, 193, 382/194
See application file for complete search history.

(56) References Cited

U.S. PATENT DOCUMENTS

| 4,343,539 | A | * | 8/1982 | Task ............................ 353/122 |
| 5,627,311 | A | * | 5/1997 | Nakaya et al. ................ 73/147 |
| 6,554,431 | B1 | * | 4/2003 | Binsted et al. ................ 353/28 |
| 8,213,707 | B2 | * | 7/2012 | Li et al. ........................ 382/154 |
| 2012/0223885 | A1 | | 9/2012 | Perez | |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Tony Ko
*Assistant Examiner* — Magda Cruz
(74) *Attorney, Agent, or Firm* — Lee & Hayes, PLLC (57) ABSTRACT

Devices and techniques are described for automatically calibrating a projector system. The projector system undergoing calibration is coupled to a computing device and an automated positioning platform coupled to a target structure. The computing device acquires images using a calibrated camera of one or more patterns projected by the projector onto the target structure when the target structure is in a plurality of repeatable poses. From these acquired images, intrinsic projector parameters may be determined. Once determined, the parameters may be used to correct images produced by the projector or acquired by the camera which include a projected pattern or portion thereof.

20 Claims, 6 Drawing Sheets

AUTOMATIC PROJECTOR CALIBRATION

PRIORITY

The present application is a continuation of and claims priority to pending U.S. application Ser. No. 13/419,799, filed on Mar. 14, 2012, entitled "Automatic Projector Calibration", which is incorporated by reference herein in its entirety.

BACKGROUND

Projectors are used for a variety of applications including human-machine interfaces, augmented reality environments, gaming, metrology, and so forth. These applications typically benefit from calibrating the corresponding projectors prior to using these projectors to project images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An image projector, or projector, may be used in a variety of settings. The projector comprises various optical elements which introduce distortion into a projected image. In some settings, such as machine vision to support an augmented reality environment, a calibrated projector which accounts for these distortions may prove useful. For example, the augmented reality environment may use structured light techniques to project known patterns onto objects to determine their shape, distance, and so forth. By generating a calibrated image for projection, overall performance of these systems is improved.

Projector calibration allows for determination of calibration data such as intrinsic projector parameters and extrinsic projector parameters. The intrinsic projector parameters include, but are not limited to, focal point, principal point, skew coefficients, and so forth. The extrinsic projector parameters include, but are not limited to, target distance, relative angles between the projector and the target, and so forth. Once the parameters are determined, adjustments or compensation may be made to account for them, improving overall accuracy of projected images.

Disclosed herein are systems and techniques for automatically calibrating a projector system. These systems and techniques allow calibration that is free from human intervention, minimizes or eliminates potential for human error, reduces calibration time, improves calibration accuracy, and so forth.

The projector under calibration is configured to project a pattern onto a target at with varying distances, orientations, or both relative to the projector. A particular combination of distance and orientation of the target relative to the projector is termed a "pose." A computing device acquires images of the projected pattern from a camera and sets the target using a computer-controlled mechanism to varying poses without user intervention while acquiring calibration images. These varying poses are repeatable in that substantially the same pose may be generated again upon command.

An observed location of particular points such as fiduciary markers (or "fiducials") in the projected pattern as projected are generated based on the acquired images. These fiducials may form a pattern, such as a checkerboard. Features of the fiducials such as corners, edges, and so forth may be extracted. Based on prior knowledge of the fiducials their spatial arrangement, and at least a portion of the extracted features, one or more calculated locations may be generated. For example, corners of the checkerboard may be recognized. From these corners and a count of the number of squares in the checkerboard, calculated locations of intersections between squares may be determined.

Intrinsic and extrinsic projector parameters may then be generated based on comparison of the observed locations with the calculated locations. The calculated locations are outputs of a function of these parameters. The intrinsic projector parameters may include a focal point, principal point, skew coefficient(s), distortion coefficient(s), and so forth. Extrinsic projector parameters may include target distance, relative angles between the projector and the target, and so forth.

Using the outputs of the function of the intrinsic and extrinsic parameters, a reprojection error may be calculated. The reprojection error expresses the variance between the observed location and the calculated location. For example, for a given corner of the checkerboard in the camera image, a corresponding three-dimensional (3D) location of the corner may be calculated using estimated parameters. The estimated 3D location is then compared with the 3D position of the corresponding physical checkerboard corner. Then a reprojection error may be defined, such as the observed location is +0.5 pixels along an x-axis and −0.3 pixels along a y-axis of the checkerboard.

By utilizing the repeatability of the computer-controlled mechanism, images from repeatable poses may be acquired for use in multiple iterations. By iterating the calibration process, accuracy may be improved such the reprojection error in some implementations may attain sub-pixel accuracy. Said another way, by iterating the calibration may be refined such that the observed location and the calculated locations converge.

In some implementations, the distance between the projector and the target may be varied under computer control. This variation in distance may maintain the projected target in a full field-of-view of the camera, adjust to account for varying throw distances such as changing optical zoom settings, and so forth.

The intrinsic projector parameter data may be stored and used to calibrate images generated by the projector using image distortion correction. The projector once calibrated may then be used for high-precision applications such as generating structured light patterns for scanning objects in an augmented reality environment, metrology, medical image presentation, and so forth.

Illustrative Environment

Figure 1:
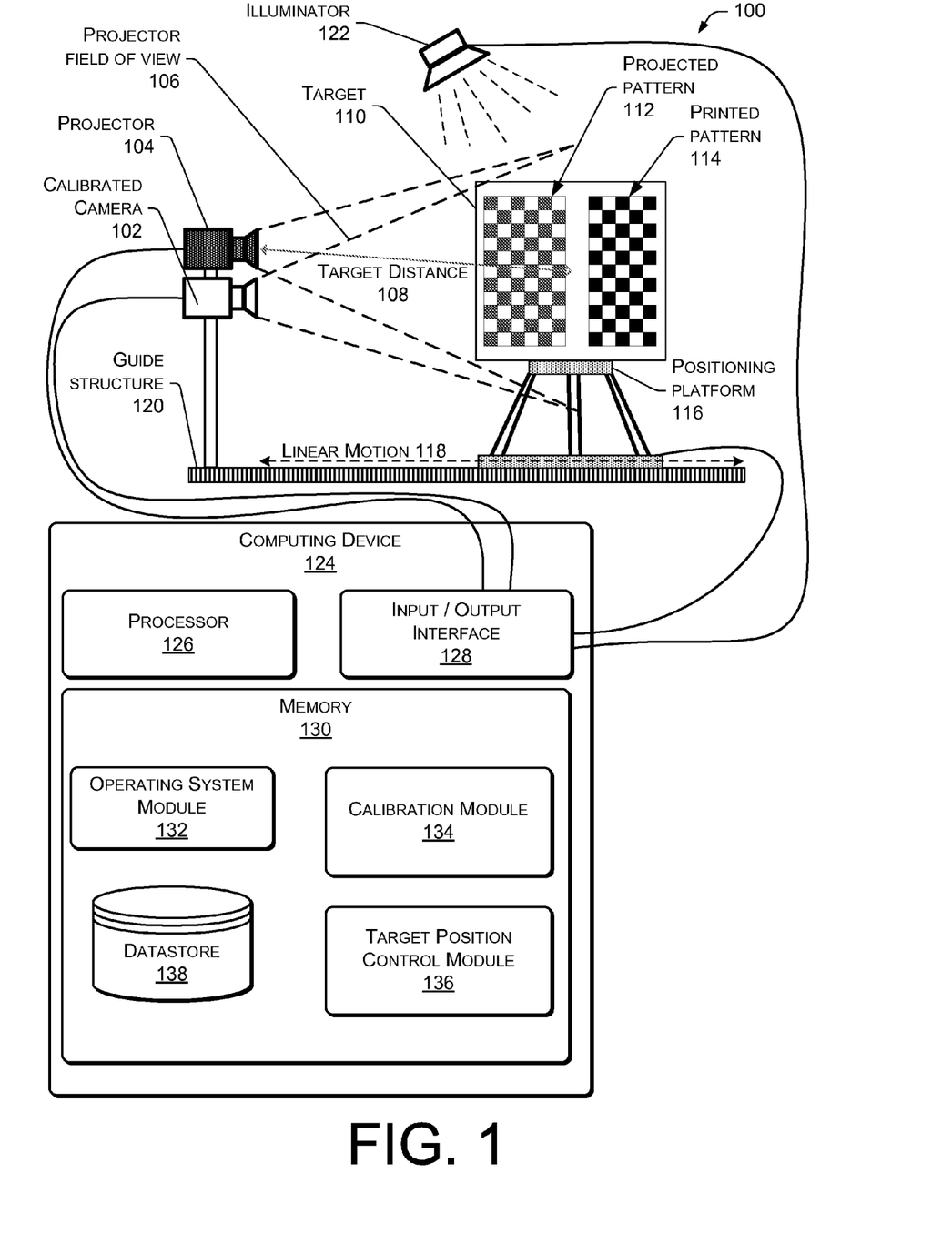
FIG. 1 shows an illustrative automated projector calibration system.

FIG. 1 shows an illustrative automated projector calibration system 100 with a calibrated camera 102. This camera has been calibrated to account for intrinsic camera properties which account for variations and distortions between an image of the scene as it actually appears and the image as acquired. The camera 102 is configured to generate images from visible light, non-visible light, or both. For example, in one implementation the camera 102 may be configured to generate a thermal image as well as a visible light image. The camera 102 comprises an imaging element such a charge-coupled device (CCD), complementary metal-oxide semiconductor (CMOS), microbolometer array, and so forth. The camera 102 also comprises one or more optical elements such as lenses, prisms, mirrors, and so forth. The camera 102 may be housed within a chassis.

The camera 102 has a camera field of view which describes a particular solid angle originating at a particular point-of-view. The camera field of view may vary according to changes in the configuration of the camera 102. For example, an optical zoom of the camera may narrow the camera field of view.

A projector 104 for calibration is also depicted which is configured to project images onto surfaces in an environment. These images may be visible light images perceptible to the user, visible light images imperceptible to the user, images with non-visible light, or a combination thereof. The projector 104 also comprises one or more optical elements such as lenses, prisms, mirrors, and so forth. The projector 104 may be housed within a chassis. In some implementations the camera 102 and the projector 104 may share a common chassis.

The projector 104 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 104 has a projector field of view 106 which describes a particular solid angle. The projector field of view 106 may vary according to changes in the configuration of the projector. For example, the projector field of view 106 may narrow upon application of an optical zoom to the projector.

A target distance 108 separates the projector 104 from a projection target 110, or simply a "target" 110 hereinafter. The target distance 108 may be measured between a designated point relative to the projector 104 and a designated point relative to the target 110. For example, the target distance 108 may be from a front edge of the chassis of the projector to the center of the target 110.

The target 110 comprises a substrate configured to act at least in part as a projection surface such that a projected pattern 112 in a repeatable fashion after one or more physical translations, rotations, or combinations thereof. The target 110 may comprise one or more structural elements to maintain the substrate. In some implementations the target 110 may comprise glass, metal, plastic, paper, and so forth. Furthermore, the target 110 may be placed at a distance 108 such that the entire projected pattern 112 is within the projector and camera fields of view. The target 110 may be planar or comprise non-planar surface features.

The projected pattern 112 is configured to be projected by the projector 104 and visualized by the camera 102 after interacting with at least a portion of the target 110. For example, where the projector 104 operates in infrared wavelengths, the camera 102 may be configured to acquire images in those infrared wavelengths.

In some implementations a plurality of projected patterns 112 may be used. For example, a first image may be acquired by the camera 102 when a first projected pattern 112(1) is projected on the target 110, a second image may be acquired of a second projected pattern 112(2), and so forth.

The projected pattern 112 comprises one or more features arranged in a known configuration. For example, a checkerboard projected pattern 112 comprising alternating white and dark squares is shown here. The squares may be of one or more sizes including but not limited to 20, 30 or 50 millimeters on each side. The projected pattern 112 may include different size squares. For example, one section of the projected pattern 112 may comprise 20 mm squares while a second section comprises 30 mm squares.

In other implementations, other patterns may be used. The projected pattern 112 comprises one or more fiduciary markings or fiducials. These fiducials provide reference points in the projected pattern 112.

In some implementations a printed pattern 114 may also be present on a portion of the target 110. The printed pattern is non-projected, that is, it is present on the target 110 regards of whether the projector 104 is presenting an image. The printed pattern 114 may be printed, photolithographically produced, etched, and so forth.

The target 110 is coupled to a positioning platform 116. This positioning platform 116 is configured to move in one or more degrees of freedom relative to the projector 104. These degrees of freedom may include but are not limited to roll, pitch, yaw, heave, sway, surge, or a combination thereof to the target 110. For example, as shown here the positioning platform 116 may comprise a Stewart platform, also known as a synergistic motion platform, comprising a plurality of actuators which when activated move the target 110 into a new pose. The positioning platform 116 may comprise one or more linear actuators, rotary actuators, motors, electroactive polymers, piezoelectric actuators, and so forth.

The positioning platform 116 may be further configured to move in a linear motion 118 along a guide structure 120. This may be linear motion 118 along one or more axes. The guide structure 120 provides a substantially rigid reference frame between the camera 102, the projector 104, and the positioning platform 116 holding the target 110. The guide structure 120 may comprise metal, ceramics, plastics, or a combination thereof.

The linear motion 118 between the target 110 and the projector 104 allows for changes in pose during the calibration process. For example, the positioning platform 116 may be configured to move the target 110 towards or away or left or right relative to the projector 104 by actuating one or more motors.

While the target 110 is shown moving relative to the camera 102 and the projector 104, in some implementations the target 110 may remain stationary while the camera 102, the projector 104, or both are displaced. In another implementation the camera 102, the projector 104, and the target 110 may be configured to move independently of one another. For example, the projector 104 may be configured to pan left and right while the target 110 is configured to tilt up and down. By combining these relative motions, various combinations of relative angles between the projector 104 and the target 110 may be produced.

An illuminator 122 may be used to provide known or controlled illumination of the target 110, in particular the printed pattern 114 which may be thereon, during acquisition of images by the camera 102. The illuminator 122 may comprise an incandescent, fluorescent, or solid-state device configured to provide illumination compatible with the printed pattern 114 and the camera 102. The illuminator 122 may be configured to provide one or more illumination levels to the target 110. In some implementations the illuminator 122 may be calibrated to provide illumination to the target 110.

A computing device 124 comprising a processor 126, an input/output interface 128, and computer-readable storage media (CRSM) 130 is shown. The processor 126 may comprise one or more processors configured to execute instructions. The instructions may be stored in the CRSM 130, or in other CRSM or memory accessible to the processor 126.

The input/output interface 128 may be configured to couple the computing device 124 to other components within the environment 100 including the camera 102, the projector 104, the positioning platform 116, the illuminator 122, user interface devices, and so forth. The input/output interface 128 may be configured to couple to other devices outside the environment, such as cloud servers via a network interface.

The CRSM 110 may be any available physical media accessible by a computing device to implement the instructions stored thereon or store data within. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 110 and configured to execute on a processor, such as the processor 126. Modules may also be stored in storage devices accessible on a local network, cloud storage accessible via a wide area network or distributed across a combination thereof. An operating system module 132 is configured to manage hardware and services within and coupled to the computing device 124 for the benefit of other modules.

A calibration module 134 is configured to generate calibration data for the projector 104. This calibration data may include intrinsic projector parameters as well as extrinsic projector parameters. This calibration data is based at least in part on images of the projected pattern 112 as acquired from the camera 102 on the target 110 in different poses. The different poses result from control of the positioning platform 116 by a target position control module 136. The target position control module 136 is configured to direct actuators coupled to the positioning platform 116 in order to move the target 110 to a pre-determined pose. The actuators may be configured to provide positioning feedback, allowing for precision determination of the relative position of the physical structures. For example, one or more linear actuators of the positioning platform 116 may be configured with linear encoders allowing for feedback as to actual displacement of the actuator after a command to displace the actuator from the target position control module 136 has been performed.

Data associated with operation of the computing device 124 may be stored within a datastore 138. The datastore 138 may be stored on one or more of the CRSM 130, storage devices accessible on the local network, cloud storage accessible via a wide area network, or distributed across one or more of these. For example, camera calibration data for the camera 102 as well as projector calibration results for the projector 104 may be stored within the datastore 138.

Figure 2:
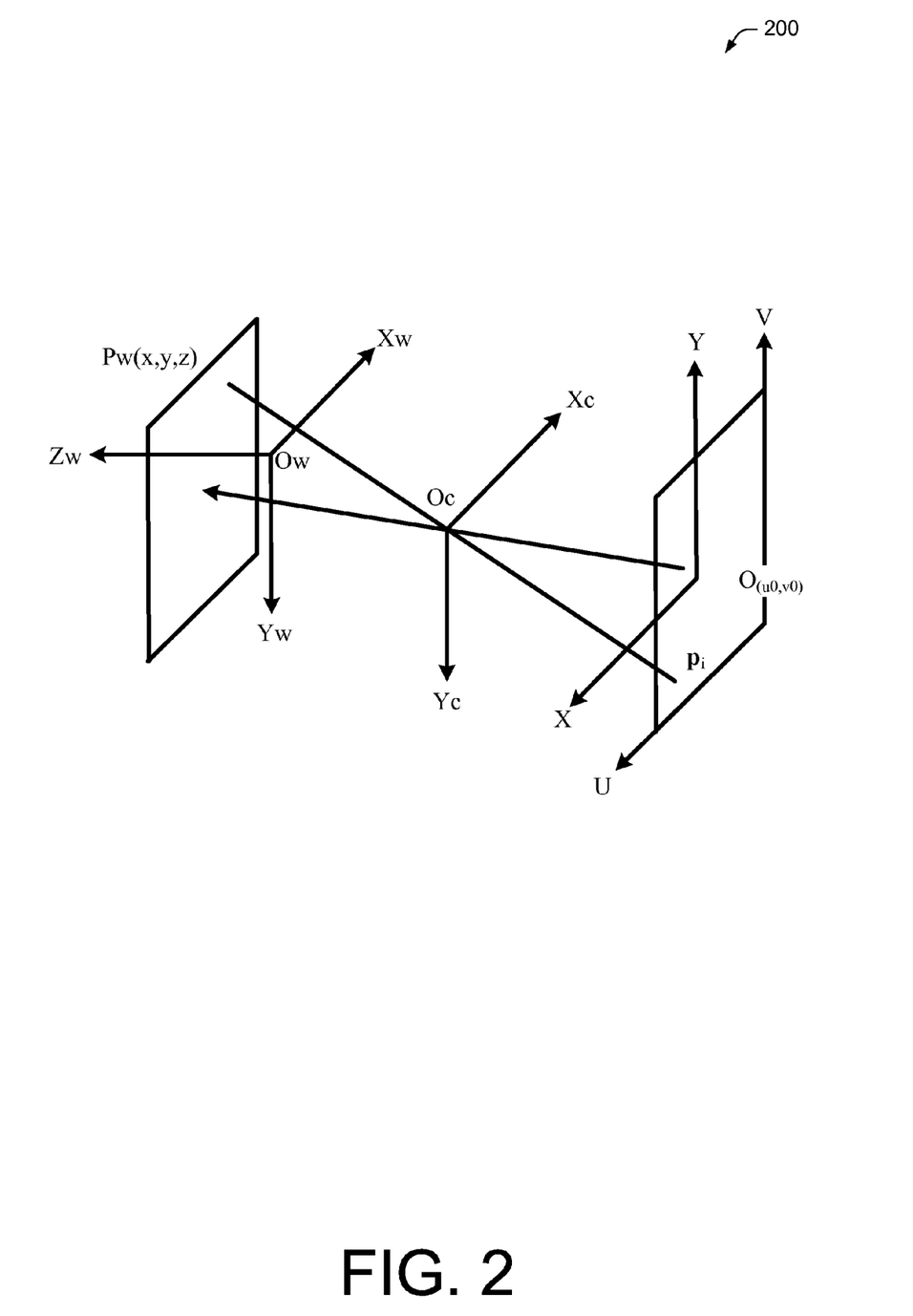
FIG. 2 illustrates projector-related coordinate relationships.

FIG. 2 illustrates projector- and camera-related coordinate relationships 200 as discussed herein. The following discussion, while describing cameras is also applicable to projectors. In this illustration, Pw (x,y,z) represents the coordinate of a measured point with respect to the world coordinate in object space, Pc(xc, yc, zc) the corresponding coordinate of P in camera coordinate system, and Pi(u,v) represents the image point P with respect to an image coordinate O.

The projector 104 has intrinsic parameters and extrinsic parameters. The intrinsic parameters are those internal to the optical system of the projector 104. The extrinsic parameters are those which relate to factors external to the projector 104 optical system, such as overall direction of the camera relative to a reference point in the environment. Individual intrinsic parameters are discussed in more detail below with regards to FIG. 3 while extrinsic parameters are discussed in more detail below with regards to FIG. 4.

The intrinsic and extrinsic parameters and their relations are shown as follows:

$$z_c \begin{bmatrix} u \\ v \\ 1 \end{bmatrix} = \begin{bmatrix} a_x & s & u_0 \\ 0 & a_y & v_0 \\ 0 & 0 & 1 \end{bmatrix} * \begin{bmatrix} R & t \\ o_3^T & 1 \end{bmatrix} * \begin{bmatrix} x_w \\ y_w \\ z_w \\ 1 \end{bmatrix} = \quad \text{(Equation 1)}$$

$$\begin{bmatrix} m_1 & m_2 & m_3 & m_4 \\ m_5 & m_6 & m_7 & m_8 \\ m_9 & m_{10} & m_{11} & m_{12} \end{bmatrix} * \begin{bmatrix} x_w \\ y_w \\ z_w \\ 1 \end{bmatrix}$$

Where $m_1$ to $m_{12}$ represent twelve unknown camera parameters and $a_x$, $a_y$, s, $u_0$, $v_0$, R, and t are the parameters the calibration system 100 may determine. As described above, the camera parameters comprise of intrinsic parameters $a_x$, $a_y$, s, $u_0$, $v_0$ and extrinsic parameters R and t. The intrinsic and extrinsic parameters may be solved for once $m_1$ to $m_{11}$ are known.

As used herein, $a_x$ is a ratio of the focal length and the unit pixel dimension with respect to the x-axis. Similarly ay is a ratio with respect to the y-axis, s is the skew, and u0, v0 are the pixel plane center coordinates. R is the rotation metric and t is the translation vector. Herein, $a_x$ is the focal length over the unit pixel dimension with respect to x-axis and $a_y$ with respect to y-axis, s is skew, and $u_0$, $v_0$ are pixel plane center coordinates. R is the rotation metric and t is the translation vector. A projector may be considered the inverse of a camera, therefore the same parameters used for a camera can be considered for projector parameters.

Figure 3:
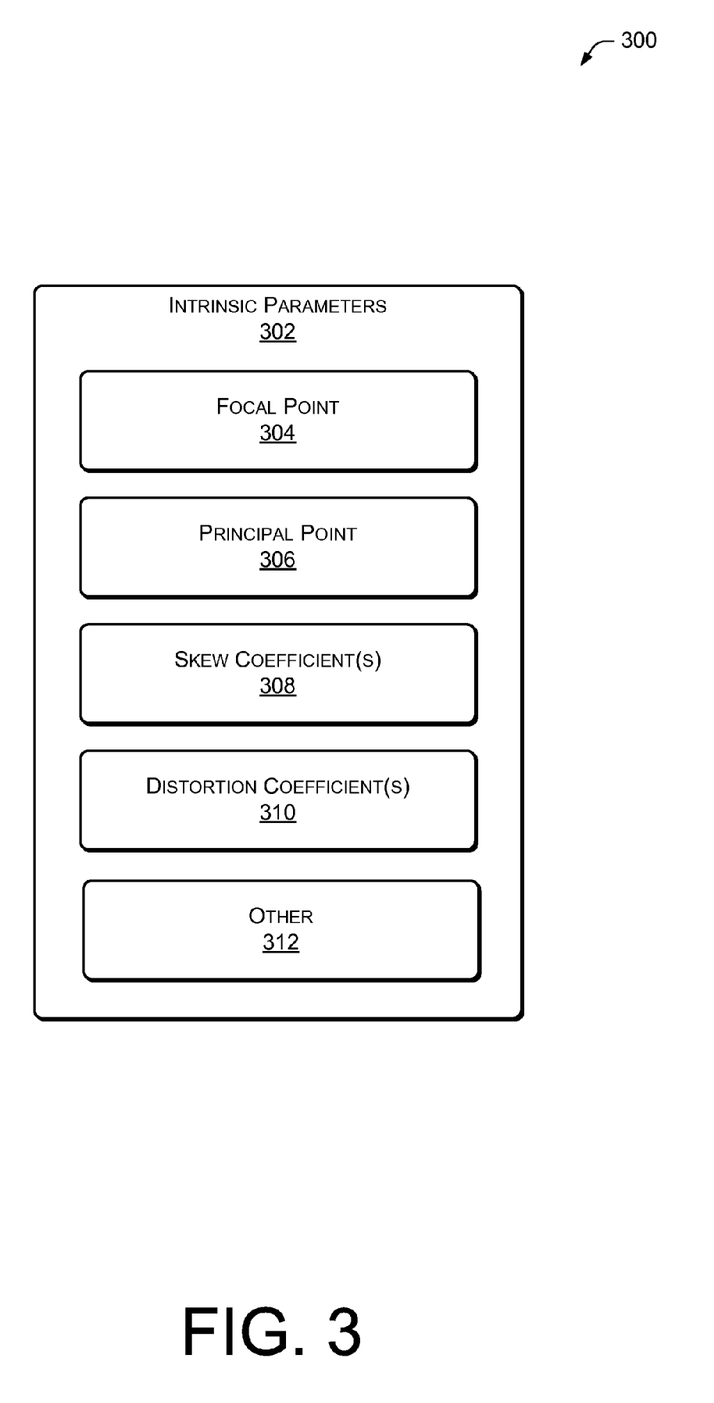
FIG. 3 illustrates intrinsic parameters which may be determined by the automated projector calibration system.

FIG. 3 illustrates intrinsic parameters 302 which may be determined or altered by the automated projector calibration system 100 for the projector 104. Similar intrinsic camera parameters may have been previously determined during calibration of the camera 102.

A focal point 304 of the projector 104 system may be determined in some instances. The focal point 304 is a point within relative to optical elements within the projector 104 at which collimated light is parallel to the axis of the optical system. A focal length is a distance from a principal plane of a lens or mirror to the focus.

A principal point 306 may also be determined using the automated camera calibration system 100. The principal point 306 is a point at which a principal plane crosses an optical axis. Other intrinsic parameters include one or more skew coefficients 308 and distortion coefficients 310. The skew coefficients 308 define an angle between x and y pixel axes. The distortion coefficients 310 describe radial, tangential, or radial and tangential variations. In other implementations other 312 intrinsic camera parameters may also be determined.

Figure 4:
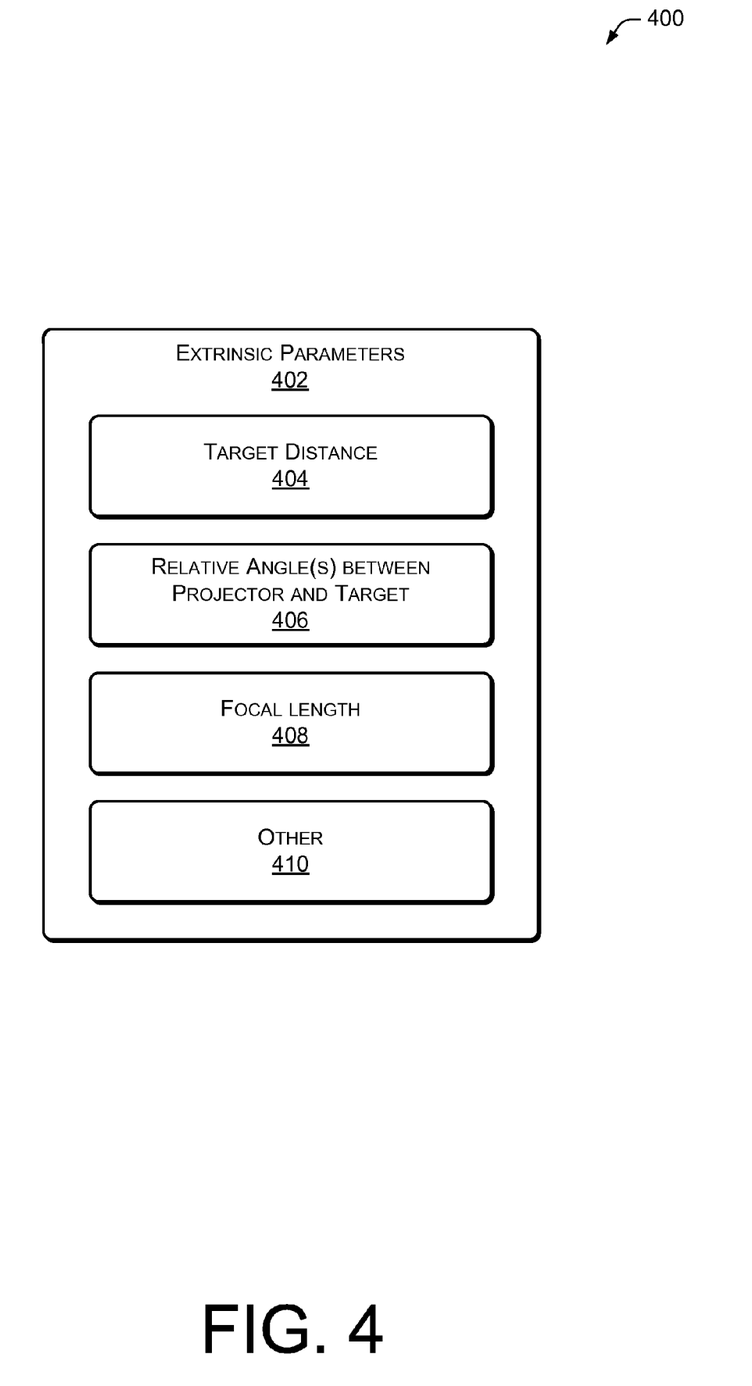
FIG. 4 illustrates extrinsic parameters which may be determined by the automated projector calibration system

FIG. 4 illustrates extrinsic parameters 402 which may be determined by the automated projector calibration system 100. The extrinsic parameters 404 describe the overall projector system in relation to the outside environment. As shown here, these parameters may include a target distance 404, which is a distance between the projector 104 and the target 110. One or more relative angles between the projector 104 and the target 110 may also be defined. A relative rotation 408 between the projector 104 and the target 110 may be considered as well. In other implementations, other 410 extrinsic parameters may be determined.

Figure 5:
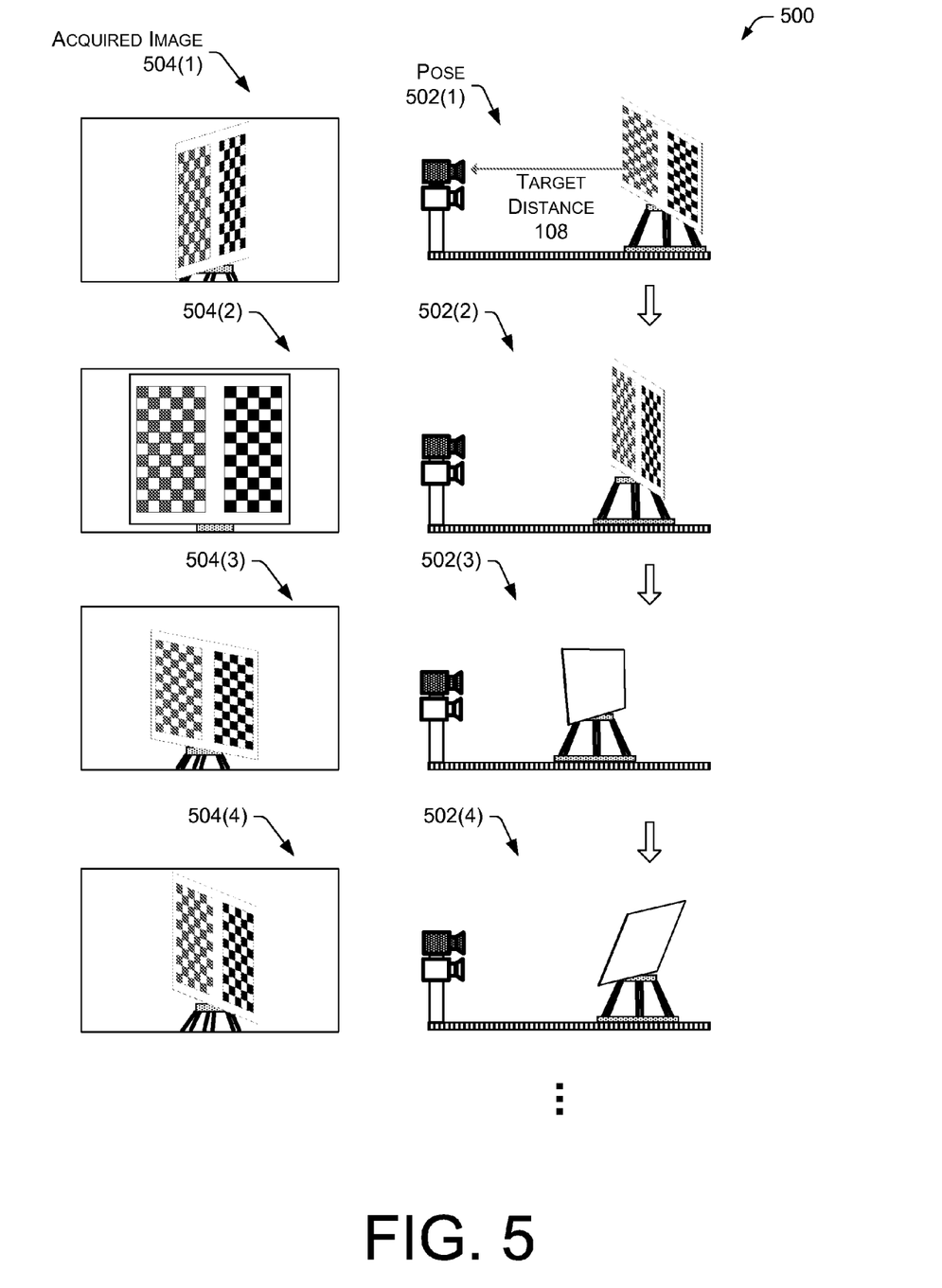
FIG. 5 illustrates a series of acquired images of a projected pattern on a target in different poses relative to the projector.

FIG. 5 illustrates a series 500 of acquired images of a calibration target 110 in different poses relative to the projector 104. A series of poses 502(1)-(4) are shown, as well as corresponding acquired images 504(1)-(4) as received from the camera 102. As the pose 502 changes, the camera 102 acquires one or more images of the projected pattern 112 on the target 110.

For example, as shown here, while in the pose 502(1) the camera 102 may acquire a predetermined number of images of the projected pattern 112 to form a set of images. This predetermined number may be set to a particular value such as twenty, or may involve a trigger event, such as acquiring images until a particular threshold condition is met. For example, images may be acquired until the projected pattern 112 is in focus.

As described below with regards to FIG. 6, an image may be selected from this set which is suitable for further processing. Once that set has been acquired, the positioning platform 116 may then reposition the target 110 to the second pose 502(2), during which another set of images of the projected pattern 112 are acquired. By acquiring several images from different poses, in some implementations the system may iteratively refine the projector calibration.

As mentioned above, the positioning platform 116 may impart linear motion 122 which changes the target distance 108. As shown here, at 502(4), the positioning platform 116 has moved closer to the projector 104. Changes in target distance 108 may be used to accommodate changes in zoom by the projector 104. For example, a high zoom factor of the projector 104 may be used with a first target distance 108 such as pose 502(1) while the same projector 104 operating with a low zoom factor may have a second target distance 108 less than the first, such as shown at 502(4).

Based on the pose and the images acquired, the calibration module 134 is configured to generate calibration data for use in calibrating the projector 104. The process of generating the calibration data is described next with regards to FIG. 6.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other devices as well.

Figure 6:
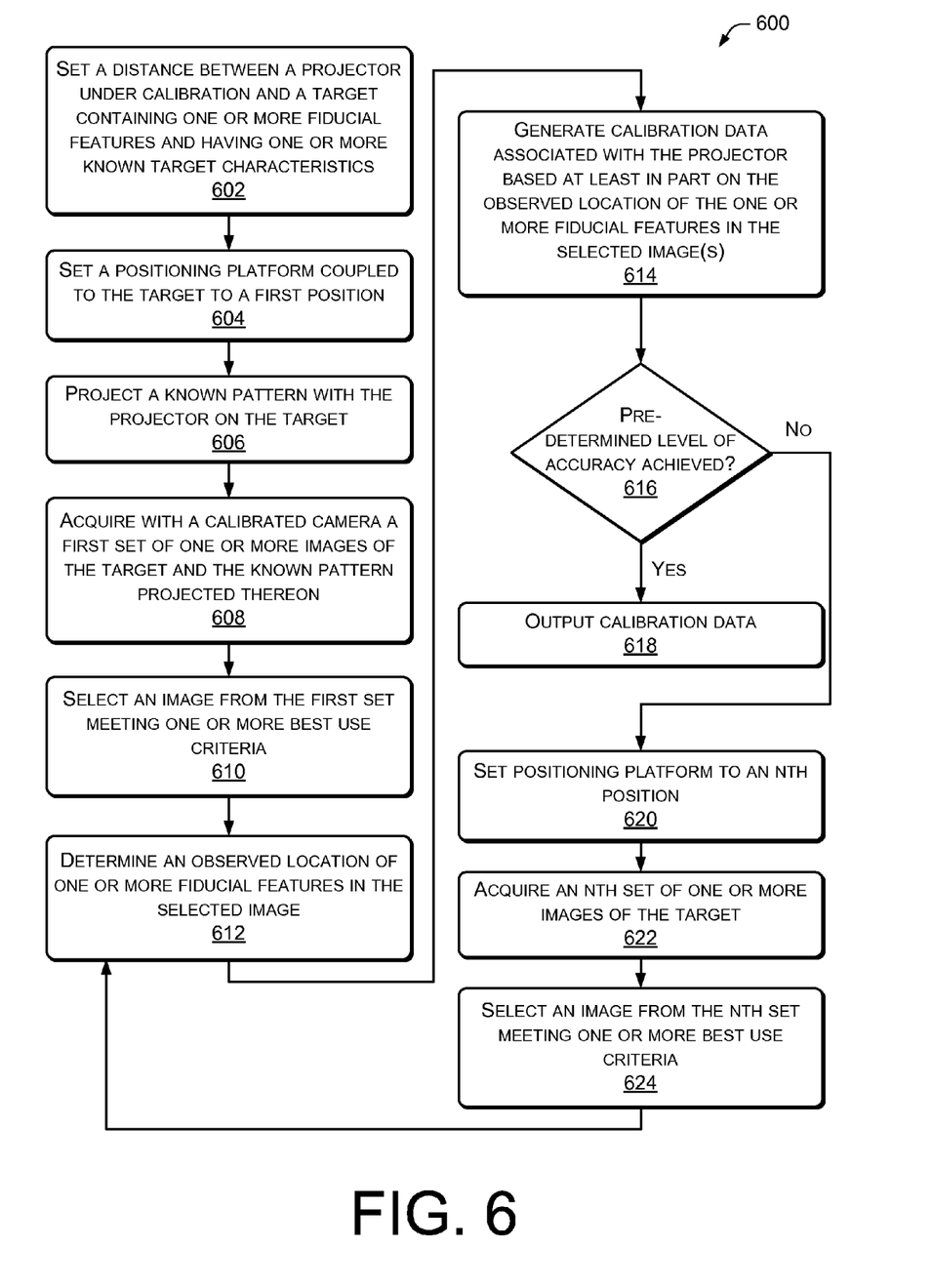
FIG. 6 is a process of determining with an automated system calibration data.

FIG. 6 is a process 600 of determining projector calibration data with an automated system. The process 600 may be repeated using distinct poses to gather variation data across these poses. In some implementations poses may be re-used. For example, poses 502(1), 502(2), 502(3), and 502(1) may be used to acquire image data of the target.

At 602, a distance between the projector 104 under calibration and the target 110 is set. For example, the positioning platform 116 may move in a linear motion 118 along the guide structure 120 resulting in displacement of the target 110 relative to the projector 104 such that the target 110 fills the field-of-view of the camera 102. In one implementation, the target 110 may be considered to fill the field of view of the camera 102 when at least one side or edge of the target 110 extends from substantially one edge of the camera's field-of-view to an opposite edge. The one or more fiducials exhibit one or more known target characteristics, such as known number of squares, known dimensions of the squares, and so forth.

At 604, the positioning platform 116 is set to a first position. For example, the positioning platform 116 may orient the target 110 such that it is orthogonal to the projector 104. The target 110 is now in a first pose.

At 606 a known projection pattern 112 is projected on the target 110 by the projector 104. For example, a checkerboard pattern may be projected. At 608, a first set of one or more images are acquired of the target 110 with the projected pattern 112 thereon. These acquired images comprise the projected pattern 112 and the fiducials. In some situations, some of the images in the set may be unsuitable for further use and may be disregarded for further analysis. These may be discarded or non-selected.

At 610, at least one image is selected from the first set which meets one or more best use criteria. These best use criteria may include focus, best fit of lines through the grid pattern, contrast, image noise, clearest image, whether the entire projected pattern 112 is present within the acquired image, presence of reflections, and so forth. For example, an image in which the projected pattern 112 is out of focus may be discarded or non-selected.

At 612, an observed location of one or more fiducial features in the selected image is determined. For example, the corners of the projected pattern 112 may be identified, designated, and located within the acquired image which has been selected.

At 614, calibration data associated with the projector is generated based at least in part on the observed location of the one or more fiducial features in the selected image(s).

At 616, a determination is made as to when a pre-determined level of accuracy is achieved. When a pre-determined level of accuracy is achieved, the process proceeds to 618. At 618, the calibration data is outputted. For example, the calibration data may be stored in the datastore 138, or transmitted to another device via the input/output interface 128.

When at 616 the pre-determined level of accuracy is not achieved, the process continues to 620 where additional iterations of poses and images are acquired and used to generate and refine the calibration data.

At 618, the positioning platform is set to an nth position, where "n" is an integer number greater than zero. At 620, an nth set of one or more images of the target are acquired. At 622, an image is selected from the nth set which meets one or more best use criteria, such as described above. The process then returns to 610 to determine an observed location of the one or more fiducial features in the selected image. The process then proceeds on to 612 to generate or refine calibration data based at least in part on the observed location of the one or more fiducial features in the selected image.

The number of poses and corresponding iterations may vary depending upon the number of projector parameters to be determined, level of accuracy to be produced, and so forth. For example, to provide constraints allowing solution of the unknowns in Equation 1, twenty or more different poses and corresponding images may be used.

By using the techniques and systems described herein, the calibration data including intrinsic parameters may be accurately and quickly determined for projectors. This calibration data may be associated with the projector and used for processing images such that resulting projected images provide a very high level of precision and accuracy with regards to the image to be presented.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. A system comprising:
a target structure;
an automated positioning platform coupled to the target structure and under control of one or more computing systems, the positioning platform configured to orient the target structure in a plurality of poses by moving in one or more degrees of freedom at least partly in response to receiving corresponding instructions from the one or more computing systems;
a projector configured to generate a projected pattern comprising one or more fiducial features onto at least a portion of the target structure;
a camera configured to acquire one or more acquired images of the target structure in each of the plurality of poses as presenting the projected pattern;
a calibration module configured to:
 determine an observed location of the one or more fiducial features projected onto the target structure in the one or more acquired images; and
 generate calibration data associated with the projector based at least in part on the observed location of the one or more fiducial features in the one or more acquired images.

2. The system of claim 1, the camera comprising a calibrated camera.

3. The system of claim 1, wherein the projected pattern comprises a checkerboard pattern.

4. The system of claim 1, wherein the projector comprises a digital micromirror device.

5. The system of claim 1, wherein the positioning platform is configured to vary a linear target distance between the target structure and the projector before acquisition of the image by the camera and at least partly in response to receiving a corresponding instruction from the one or more computing systems.

6. The system of claim 1, wherein the positioning platform comprises a Stewart platform.

7. The system of claim 1, wherein the positioning platform comprises two or more rotary stages coupled to one another.

8. The system of claim 1, the calibration data comprising one or more intrinsic projector parameters.

9. The system of claim 8, the one or more intrinsic projector parameters comprising a focal point, a principal point, or both a focal point and a principal point.

10. The system of claim 8, the calibration data comprising one or more extrinsic projector parameters.

11. One or more computer-readable storage media storing instructions that, when executed by one or more processors, cause the one or more processors to perform acts comprising:
setting, to a pose, a positioning platform coupled to a target;
projecting, onto the target, one or more projected patterns having one or more fiducial features;
acquiring, with a camera, a set of one or more images of the target and the one or more projected patterns while the positioning platform is in the pose;
selecting an image from the set of one or more images meeting one or more criteria;
determining an observed location of the one or more fiducial features in the selected image; and
generating calibration data associated with the projector based at least in part on the observed location of the one or more fiducial features.

12. The one or more computer-readable storage media of claim 11, further comprising:
until a pre-determined level of accuracy in the calibration data has been reached:
setting the positioning platform to an nth pose,
acquiring, with the camera, an nth set of one or more images of the target while the positioning platform is in the nth pose;
selecting a nth selected image from the nth set of one or more images meeting one or more criteria;
determining an observed location of one or more fiducial features in the nth selected image; and
generating calibration data associated with the projector based at least in part on the observed location of the one or more fiducial features in the nth selected image.

13. The one or more computer-readable storage media of claim 11, the determining of the location of the one or more fiducial features in the selected image comprising identifying a plurality of corners of the one or more fiducial features.

14. The one or more computer-readable storage media of claim 11, the one or more criteria comprising one or more of:
fit of lines to a pre-determined value through a pattern projected on the target by the projector,
an amount of image distortion, or
an amount of image clarity.

15. The one or more computer-readable storage media of claim 11, further comprising estimating one or more intrinsic projector parameters based at least in part on the calibration data.

16. One or more computer-readable storage media storing instructions that, when executed by one or more processors, cause the one or more processors to perform acts comprising:
directing a projection target to a plurality of poses;
acquiring with a camera one or more images of the projection target presenting at least a portion of an image projected by a projector in the plurality of poses; and
generating projector calibration data based at least in part on features present in the image projected by the projector.

17. The one or more computer-readable storage media of claim 16, wherein the plurality of poses comprise different relative angles between the target and the projector.

18. The one or more computer-readable storage media of claim 16, wherein the features comprise one or more fiducial features.

19. The one or more computer-readable storage media of claim 16, wherein the generating the projector calibration data comprises determining an observed location of one or more of the features.

20. The one or more computer-readable storage media of claim 16, wherein the projector calibration data comprises one or more of the following intrinsic projector parameters:
   a focal point,
   a principal point,
   an optical skew coefficient, or
   an optical distortion coefficient.

\* \* \* \* \*